United States Patent
Tasaka et al.

(10) Patent No.: US 7,557,898 B2
(45) Date of Patent: Jul. 7, 2009

(54) SUBSTRATE GAP ADJUSTING DEVICE, SUBSTRATE GAP ADJUSTING METHOD, AND METHOD OF MANUFACTURING LIQUID CRYSTAL DISPLAY DEVICE, COMPRISING SUBSTRATE PRESSING SECTIONS THAT INDEPENDENTLY TRANSMIT FORCE

(75) Inventors: Kazuo Tasaka, Eniwa (JP); Narumi Ishibashi, Fujimi-machi (JP); Masanori Akiyama, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 332 days.

(21) Appl. No.: 11/390,795

(22) Filed: Mar. 28, 2006

(65) Prior Publication Data

US 2006/0221292 A1    Oct. 5, 2006

(30) Foreign Application Priority Data

Mar. 29, 2005  (JP) ............................. 2005-094767
Jan. 30, 2006  (JP) ............................. 2006-020093

(51) Int. Cl.
G02F 1/1333 (2006.01)
H01L 21/30 (2006.01)
H01L 21/304 (2006.01)

(52) U.S. Cl. .................. 349/187; 349/158; 349/190; 349/192; 438/455; 438/456; 438/457; 438/458; 438/460; 438/464

(58) Field of Classification Search .................. 349/158, 349/187; 438/455–460, 464
See application file for complete search history.

(56) References Cited

U.S. PATENT DOCUMENTS 5,412,492 A * 5/1995 Zammit et al. ................. 349/1

5,629,787 A * 5/1997 Tsubota et al. ............... 349/153

(Continued)

FOREIGN PATENT DOCUMENTS

JP    07-218884 A    8/1995

(Continued)

*Primary Examiner*—Andrew Schechter
*Assistant Examiner*—Paisley L Arendt
(74) *Attorney, Agent, or Firm*—AdvantEdge Law Group, LLC

(57) ABSTRACT

A substrate gap adjusting device adjusts a gap between first and second substrates in a composite substrate. In the substrate gap adjusting device, the composite substrate includes the first substrate; the second substrate that is oppositely bonded to the first substrate through a sealant, the second substrate having a smaller area than the first substrate; and liquid crystal that is injected into a space surrounded by the first substrate, the second substrate, and the sealant. The substrate gap adjusting device includes a first base that has a mounting section; a ring-shaped support member that is mounted on the mounting section and that comes in contact with a second surface out of two surfaces of the first substrate so as to support the composite substrate, the second surface being opposite to a first surface on which the second substrate is bonded; a substrate pressing section that has a movable range in a normal direction of a plane defined by the support member and comes in contact with the first substrate at a circumferential edge of the first surface in any position of the movable range; and an external applying section that transmits a force to the substrate pressing section, the force displacing the substrate pressing section within the movable range. In this structure, the circumferential edge is positioned at the outer side of the support member, as seen from the normal direction.

8 Claims, 13 Drawing Sheets

U.S. PATENT DOCUMENTS

| | | | |
|---|---|---|---|
| 6,211,938 B1 * | 4/2001 | Mori | 349/190 |
| 6,801,269 B2 * | 10/2004 | Matsumoto | 349/58 |
| 7,115,482 B2 * | 10/2006 | Maki et al. | 438/459 |
| 2002/0044253 A1 * | 4/2002 | Masuda et al. | 349/190 |
| 2003/0226633 A1 * | 12/2003 | Muramoto et al. | 156/145 |
| 2004/0095548 A1 * | 5/2004 | Lim et al. | 349/187 |
| 2008/0043210 A1 * | 2/2008 | Shibuta | 355/30 |

FOREIGN PATENT DOCUMENTS

| | | |
|---|---|---|
| JP | 2000-347198 A | 12/2000 |
| JP | 2003-005145 | 1/2003 |
| JP | 2003-255359 A | 9/2003 |
| JP | 2005-122015 A | 5/2005 |

* cited by examiner

SUBSTRATE GAP ADJUSTING DEVICE, SUBSTRATE GAP ADJUSTING METHOD, AND METHOD OF MANUFACTURING LIQUID CRYSTAL DISPLAY DEVICE, COMPRISING SUBSTRATE PRESSING SECTIONS THAT INDEPENDENTLY TRANSMIT FORCE

BACKGROUND

1. Technical Field

The present invention relates to a substrate gap adjusting device which adjusts a gap between substrates bonded through a sealant into a proper state, to a substrate gap adjusting method, and to a method of manufacturing a liquid crystal display device.

2. Related Art

In general, a manufacturing process of a liquid crystal display device includes injecting liquid crystal into a space between a pair of substrates bonded through a sealant and sealing an injection port after injecting the liquid crystal. Sealing the injection port is generally performed in a state where a pressure is applied to the substrate so that a substrate gap becomes proper, as described in JP-A-2000-347198. According to such a technique, the substrate gap is maintained in a proper state even through the application of the pressure is released after sealing.

In the sealing process, various shapes of substrates are provided. As one example among them, multiple counter substrates having a diagonal width of 1 to 2 inches are disposed to correspond to single parts on a wafer-shaped substrate. In practice, the process of sealing a composite constructed in such a manner includes a process of adjusting a substrate gap in which the respective single parts are manually pressurized one by one. That is because, if all the single parts are pressurized at a time by the pressurizing device so that a substrate gap is adjusted, the pressurizing device impedes the sealing operation.

However, if a substrate is directly pressurized so as to adjust the substrate gap, a minute flaw can occur on the surface of the substrate. Particularly, when the singles parts are manually pressurized as described above, such a problem easily occurs. Further, in the manual pressurizing, only one sheet of substrate should be pressurized at a time. Therefore, the processing takes a time. Further, it takes a long time for an operator to get proficient.

SUMMARY

An advantage of some aspects of the invention is that it provides a substrate gap adjusting device which can adjust a substrate gap corresponding to an arranged region at a time in a state where it comes in contact only with a minimum portion of the surface of a substrate, a substrate gap adjusting method, and a manufacturing method of a liquid crystal display device.

According to an aspect of the invention, a substrate gap adjusting device adjusts a gap between first and second substrates in a composite substrate. The composite substrate includes the first substrate; the second substrate that is oppositely bonded to the first substrate through a sealant, the second substrate having a smaller area than the first substrate; liquid crystal that is injected into a space surrounded by the first substrate, the second substrate, and the sealant. The substrate gap adjusting device includes a first base having a mounting section; a ring-shaped support member that is mounted on the mounting section and that comes in contact with a second surface out of two surfaces of the first substrate so as to support the composite substrate, the second surface being opposite to a first surface, on which the second substrate is bonded; a substrate pressing section that has a movable range in the normal direction of a plane defined by the support member and comes in contact with the first substrate at the circumferential edge of the first surface in any position within the movable range; and an external applying section that transmits a force to the substrate pressing section, the force displacing the substrate pressing section within the movable range. The circumferential edge is positioned at the outer side of the support member, as seen from the normal direction.

The substrate gap adjusting device applies a force to the first substrate. With the contact place between the first substrate and the ring-shaped support member being set to a supporting point, the force is concentrated on the contact region between the first substrate and the substrate pressing section. Then, the first substrate can be deformed. The deformation allows the gap between the first substrate and the second substrate to be changed, the second substrate being disposed to face the first substrate. Accordingly, if a force which is applied to the circumferential edge of the first substrate by the substrate pressing section is properly set, a substrate gap corresponding to a certain arranged region of the first substrate can be simultaneously adjusted into a proper state. At the time of adjusting a substrate gap, the first substrate comes in contact with the ring-shaped support member and the substrate pressing section. In this case, the contact place with the ring-shaped support member is only a circumference-shaped region which is determined by the shape of the support member, and the contact region with the substrate pressing section is only the circumferential edge of the second surface of the first substrate. Further, nothing comes in contact with the second substrate. As such, since the present device comes in contact only with a minimum portion of the substrate at the time of adjusting the substrate gap, the substrate is hardly damaged or corrupted.

In accordance with the above-described construction, the substrate gap corresponding to an arranged region can be adjusted at a time, without the substrate being damaged or corrupted.

In the substrate gap adjusting device according to this aspect, preferably, more than two substrate pressing sections are provided so as to press different places of the circumferential edge, the respective substrate pressing sections being displaced independently from each other. The substrate gap adjusting device having such a construction varies forces, which are applied to the respective substrate sections so as to press the first substrate, according to the shape of the first substrate. Then, the forces can be applied to the first substrate at a desired balance. Therefore, the substrate gap can be adjusted with respect to the composite substrate including the first substrate which is bent in a complex shape.

In the substrate gap adjusting device according to this aspect, preferably, the support member is ring-shaped, the plurality of substrate pressing sections have such a shape that the contact region with the first substrate is arc-shaped toward the inner circumference, and the arc-shaped portion substantially coincides with a portion of one circle which is concentric with a circle defined by the support member. Preferably, the lengths of the respective arc-shaped portions in the contact region are substantially equal to each other. In the substrate gap adjusting device having such a construction, a force can be applied evenly or at a desired balance with respect to the circumferential edge of the substantially-circular first substrate. In accordance with the above construction, in the composite substrate composed of the substantially-circular first substrate and the second substrate disposed to face the first substrate, a substrate gap corresponding to an arranged region can be adjusted at a time, without the substrate being damaged or corrupted.

In the substrate gap adjusting device according to this aspect, preferably, the substrate gap adjusting device is provided with the plurality of ring-shaped support members having different diameters. In the substrate gap adjusting device having such a construction, the number of supporting points when a force is applied to the first substrate can be increased according to the shape of the first substrate. In accordance with the above construction, a substrate gap can be adjusted with respect to a composite substrate including the first substrate which is bent in a complex shape.

In the substrate gap adjusting device according to this aspect, preferably, the substrate gap adjusting device further includes a ring-shaped second base that is detachable to the first base. Preferably, the substrate pressing section which is displaced within the movable range is attached to be relatively movable with respect to the second base, and the external force applying section is rotatable and includes a rotation input mechanism which converts the rotation of the external force applying section into the displacement of the substrate pressing section with respect to the second base. In the substrate gap adjusting device having such a construction, the second base is covered and combined with the first base on which the composite substrate is installed, so that the substrate pressing section can be caused to come in contact with a predetermined position of the first substrate without a special mechanism. Further, when a ratio of the displacement amount of the substrate pressing section to the rotation amount of the rotation input mechanism is properly set, a large rotation amount of the rotation input mechanism can be associated with the minute displacement of the substrate pressing section. In accordance with the above construction, the displacement amount of the substrate pressing section can be finely adjusted by simple control, and thus the substrate gap can be finely adjusted.

In the substrate gap adjusting device according to this aspect, preferably, the substrate gap adjusting device further includes a hand that holds the rotation input mechanism; and a motor that applies a rotation driving force to the hand. According to the construction, the rotation driving force of the motor is transmitted to the rotation input mechanism through the hand, thereby rotating the rotation input mechanism. In accordance with the above construction, the rotation input mechanism can be rotated without manual rotation control of an operator, and thus a substrate gap can be adjusted.

In the substrate gap adjusting device according to this aspect, preferably, the substrate gap adjusting device further includes a first polarizing plate, a second polarizing plate, and a light source. Preferably, the mounting section is translucent, and some of light emitted from the light source passes through the first polarizing plate, the mounting section, the composite substrate, and the second polarizing plate in this order. The light passing through the above-described light path is colored according to the substrate gap between the first and second substrates in the composite substrate. In the mounting section, only a region corresponding to the disposed region of the second substrate may be translucent. In accordance with the above construction, it can be visually recognized how much the substrate gap is adjusted.

According to another aspect of the invention, a gap between first and second substrates is adjusted in a composite substrate by a substrate gap adjusting method. The composite substrate includes the first substrate; the second substrate that is oppositely bonded to the first substrate through a sealant, the second substrate having a smaller area than the first substrate; liquid crystal that is injected into a space surrounded by the first substrate, the second substrate, and the sealant. The substrate gap adjusting method includes installing the composite substrate on the ring-shaped support member mounted on a mounting section of a first base so that a second surface out of two surfaces of the first substrate comes in contact with the support member, the second surface being opposite to a first surface, on which the second substrate is bonded; contacting a substrate pressing section with the circumference of the first surface of the first substrate, the substrate pressing section having a movable range in the normal direction of a plane defined by the support member; and pressing the substrate pressing section in a direction from the first surface to the second surface in the normal direction.

According to the substrate gap adjusting method, a force is applied to the first substrate. With the contact plate between the first substrate and the ring-shaped support member being set to a supporting point, the force is applied, concentrated on the contact region between the first substrate and the substrate pressing section. Then, the first substrate can be deformed. Further, the deformation allows the gap between the first substrate and the second substrate to be changed, the second substrate being disposed to face the first substrate. Here, if the force which is applied to the circumferential edge of the first substrate by the substrate pressing section is set properly, the substrate gap corresponding to an arranged region within the first substrate can be simultaneously adjusted into a proper state. At the time of adjusting the substrate gap, the first substrate comes in contact with the ring-shaped support member and the substrate pressing section. In this case, the contact place with the ring-shaped is only a circumference-shaped region which is determined by the shape of the support member, and the contact region is only the circumferential edge of the second surface of the first substrate. Further, nothing comes in contact with the second substrate. As such, the present device comes in contact only with a minimum portion of the substrate when adjusting a substrate gap. Therefore, the substrate is not damaged or corrupted.

In accordance with the above method, a substrate gap corresponding to an arranged region can be adjusted at a time, without the substrate being damage or corrupted.

The contacting process may include contacting more than two substrate pressing sections with the first substrate at the circumferential edge of the first surface, the respective substrate pressing sections being able to press different places of the circumferential edge. Further, the pressing process may include pressing the respective substrate pressing sections in the direction from the first surface to the second surface in the normal direction, the substrate pressing sections being pressed independently from each other. According to the substrate gap adjusting method, the respective substrate pressing sections press the first substrate with a proper force, so that the first substrate can be deformed into a desired state. Therefore, a substrate gap corresponding to a desired region within the first substrate can be adjusted into a proper state.

The support member is ring-shaped, the plurality of substrate pressing sections have such a shape that the contact region with the first substrate is arc-shaped at the inner circumference, and the arc-shaped portion substantially coincides with a portion of one circle which is concentric with a circle defined by the support member. Preferably, the lengths of the respective arc-shaped portions in the contact region are substantially equal to each other. According to such a substrate gap adjusting method, a force can be applied evenly or at a desired balance with respect to the circumferential edge of the substantially-circular first substrate. In accordance with the above method, in the composite substrate composed of the substantially-circular first substrate and the second substrate disposed to face the first substrate, a substrate gap corresponding to an arranged region can be adjusted at a time, without the substrate being damaged or corrupted.

The installing process may include installing the composite substrate on more than two ring-shaped support members having different diameters so that the second surface of the first substrate comes in contact with the support member, the ring-shaped support members being disposed on the first substrate. According to the substrate gap adjusting method, the number of supporting points when a force is applied to the first substrate can be increased according to the shape of the first substrate. In accordance with the above method, the substrate gap can be adjusted with respect to the composite substrate including the first substrate which is bent in a complex shape.

The contacting process may include combining the second base, on which the substrate pressing sections are attached, with the first base and contacting the substrate pressing section with the first substrate at the circumferential edge of the first surface. The pressing process may include rotating the rotation input mechanism serving as the external force applying section which is constructed to be rotatable and can convert its rotation into the displacement of the substrate pressing section. According to the substrate gap method, the second base is covered and combined with the first substrate having the composite substrate installed, so that the substrate pressing section can be caused to come in contact with the a predetermined position of the first substrate without a special mechanism. Further, when a ratio of the displacement amount of the substrate pressing section to the rotation amount of the rotation input mechanism is set properly, a large rotation amount of the rotation input mechanism can be associated with the minute displacement of the substrate pressing section. In accordance with the above method, the displacement amount of the substrate pressing section can be finely adjusted by simple control, and thus the substrate gap can be finely adjusted.

The substrate gap adjusting method may include holding the rotation input mechanism by using the hand and transmitting the rotation driving force of the motor to the hand so as to rotate the hand and the rotation input mechanism. In accordance with the method, the rotation input mechanism can be rotated without direct rotation control of an operator, and thus the substrate gap can be adjusted.

According to still another aspect of the invention, a method of manufacturing a liquid crystal display device includes bonding a second substrate on a first substrate through a sealant so that the second substrate is opposite to the first substrate, the second substrate having a smaller area than the first substrate; injecting liquid crystal into a space surrounded by the first substrate, the second substrate, and the sealant through an opening provided to the sealant, and manufacturing a composite substrate including the first substrate, the second substrate, the sealant, and the liquid crystal; installing the composite substrate on a ring-shaped support member so that a second surface out of two surface of the first substrate comes in contact with the support member, the second surface being opposite to a first surface, on which the second substrate is bonded; contacting a substrate pressing section with the first substrate at the circumference of the first surface, the substrate pressing section having a movable range in the normal direction of a plane defined by the support member; pressing the substrate pressing section in a direction from the first surface to the second surface in the normal direction so as to adjust the substrate gap between the first and second substrates; and sealing the opening.

According to the manufacturing method of a liquid crystal display device, the substrate gap corresponding to an arranged region within the first substrate can be adjusted at a time, without the substrate being damaged or corrupted. Further, sealing can be performed in such a state. This characteristic allows a liquid crystal display device to be manufactured at a high yield rate, according to the manufacturing method of a liquid crystal display device. Further, since the substrate gap corresponding to a plurality of single parts can be adjusted at a time, the liquid crystal display device can be manufactured in a short manufacturing time.

According to yet another aspect of the invention, a method of manufacturing a liquid crystal display device includes coating a sealant on a circumference-shaped closed region of a first substrate; dropping liquid crystal into a portion surrounded by the sealant on the first substrate; bonding a second substrate to the first substrate through the sealant so that the second substrate is opposite to the first substrate, and manufacturing a composite substrate including the first substrate, the second substrate, the sealant, and the liquid crystal; installing the composite substrate on a ring-shaped support member so that the first substrate comes in contact with the support member; contacting a substrate pressing section with the second substrate, the substrate pressing section having a movable range in the normal direction of a plane defined by the support member; and pressing the substrate pressing section in the direction from the second substrate to the first substrate so as to adjust the substrate gap between the first and second substrates.

According to the manufacturing method of a liquid crystal display device, the substrate gap corresponding to an arranged region within the first substrate can be adjusted at a time without the substrate being damaged or corrupted, when a technique in which liquid crystal is filled into a space between the substrates by a liquid crystal dropping method is applied. This characteristic allows a liquid crystal display device to be manufactured at a high yield rate, according to the manufacturing method of a liquid crystal display device. Further, since the substrate gap corresponding to a plurality of single parts can be adjusted at a time, the liquid crystal display device can be manufactured in a short manufacturing time.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described with reference to the drawings.

A. Substrate Gap Adjusting Device

Figure 1:
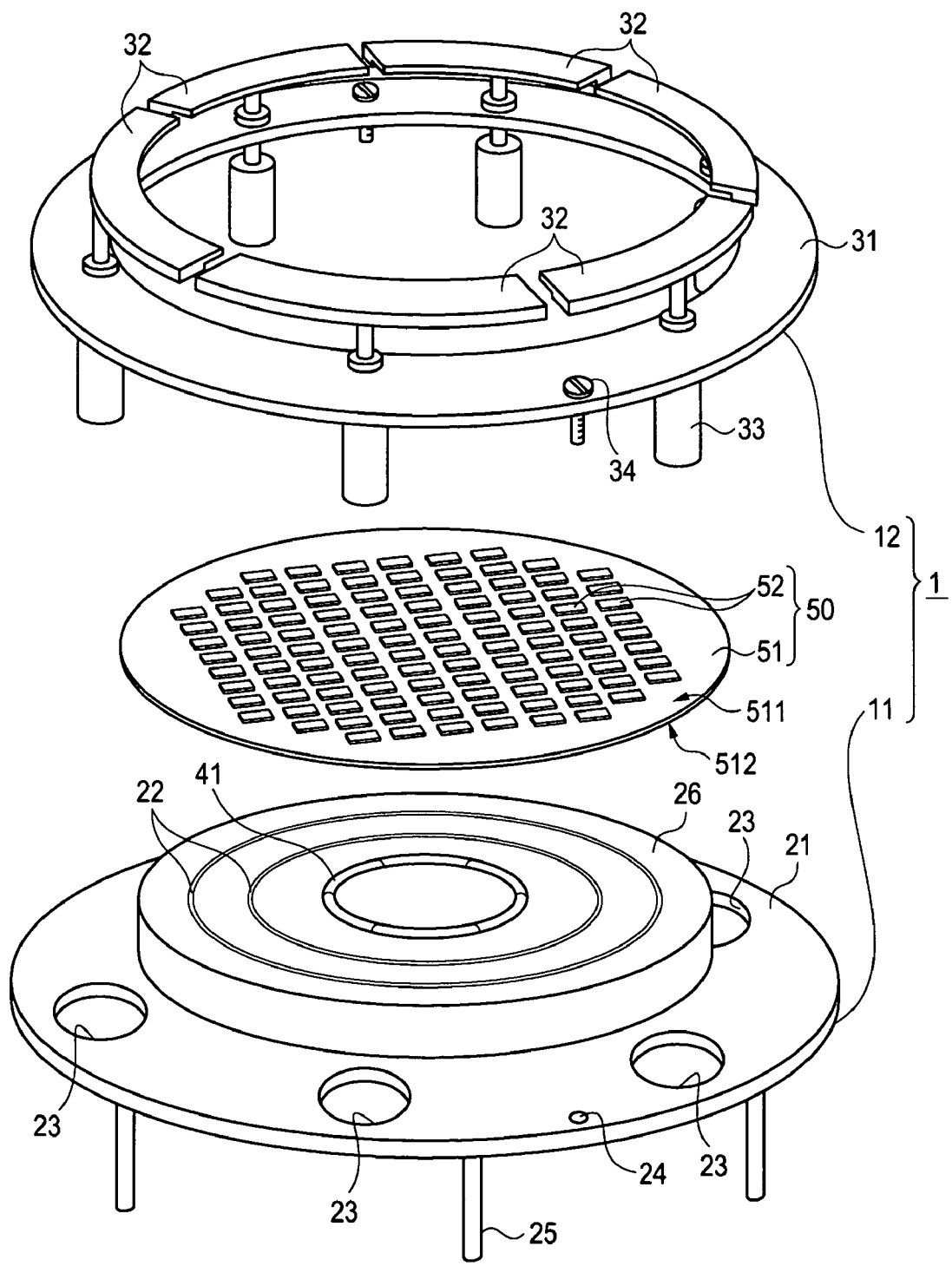
FIG. 1 is a schematic view illustrating components of a substrate gap adjusting device.

FIG. 1 is an exploded schematic view illustrating a substrate gap adjusting device 1 of the present embodiment. As shown in FIG. 1, the substrate gap adjusting device 1 is composed of a lower jig 11 serving as 'a first base' and an upper jig 12. FIG. 1 also shows a composite substrate 50 of which the substrate gap is adjusted by the substrate gap adjusting device 1.

Figure 12A:
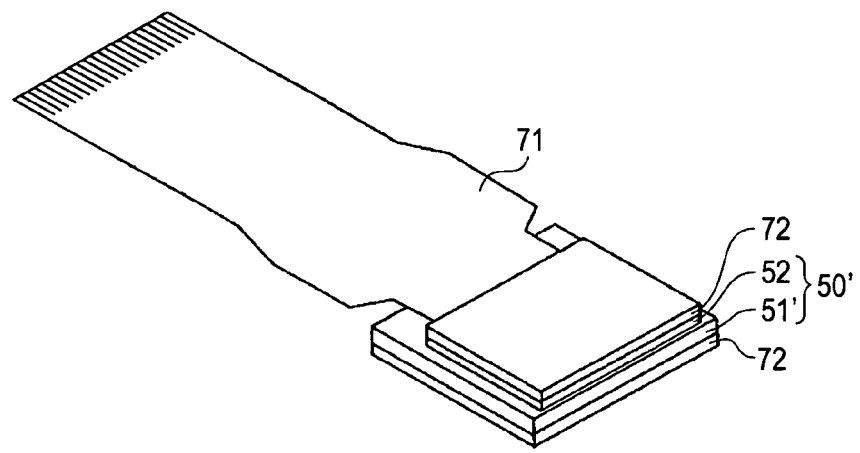
FIGS. 12A and 12B are schematic views illustrating a liquid crystal display device.
Figure 12B:
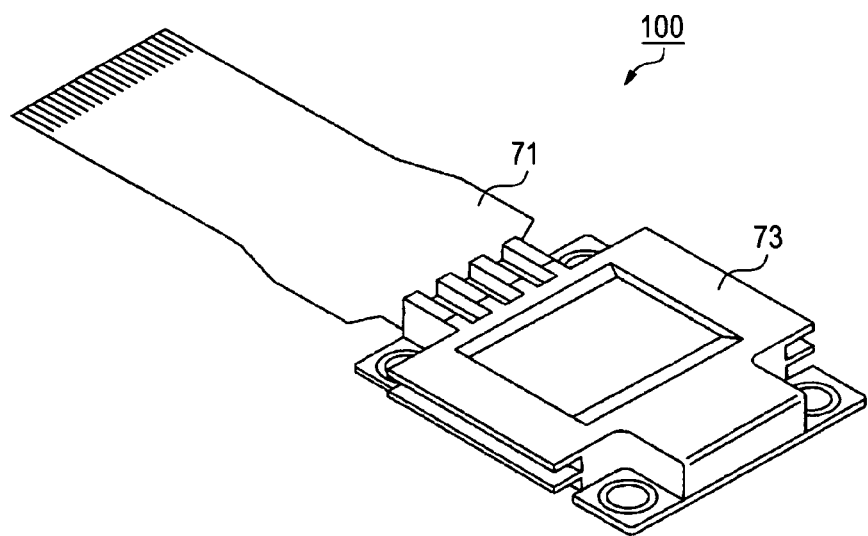

The composite substrate 50, which is one form in a manufacturing process of a liquid crystal display device 100 (refer to FIG. 12B), is composed of an element substrate 51 serving as 'a first substrate' and a counter substrate 52 serving as 'a second substrate'. The element substrate 51 is manufactured on the basis of disc-shaped quartz glass with a diameter of 12 inches. On the upper surface 511 thereof, a TFT (thin film transistor) element, metal wiring lines, a transparent electrode, an orientation film and the like are formed. On the lower surface 512 thereof, nothing is laminated. One sheet of element substrate 51 includes components corresponding to a plurality of liquid crystal display devices. Here, the upper surface 511 corresponds to 'a first surface' in the invention, and the lower surface 512 corresponds to 'a second surface' in the invention. Further, the element substrate 51 may be not formed in a perfect disc shape. For example, an orientation flat may be provided.

Figure 7A:
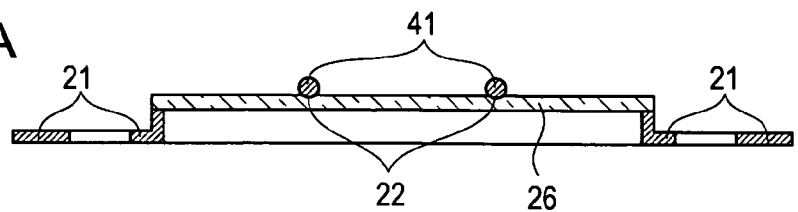
FIGS. 7A to 7E are side cross-sectional views showing a substrate gap adjusting method using the substrate gap adjusting device.
Figure 7B:
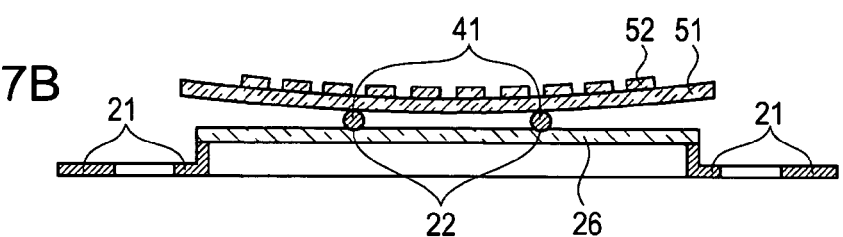

Since many layers of components are laminated only on the upper surface 511, the overall element substrate 51 is generally bent due to a difference in the thermal contraction between the components and the quartz glass, as shown in FIG. 7B. In the drawing, the bending is emphatically shown for the sake of convenience. In practice, however, the bending is so insignificant as not to be distinguished by eye.

On the upper surface 511 of the element substrate 51, the counter substrates 52 are bonded through a sealant. The counter substrate 52 is a glass substrate having a diagonal width of 1 to 2 inches, corresponding to the size of one liquid crystal display device. On the surface opposite to the element substrate 51, the transparent electrode and orientation film are formed. In a space surrounded by the element substrate 51, the counter substrate 52, and the sealant, liquid crystal injected from an injection port provided in the sealant is filled to form a liquid crystal layer.

The display quality of the liquid crystal display device 100 is sensitively influenced by the thickness of a liquid crystal layer which is determined by the substrate gap between the element substrate 51 and the counter substrate 52. For example, if the thickness of the liquid crystal layer is deviated from its proper value, the display contrast is reduced. In order to avoid such a problem, the manufacturing process of the liquid crystal display device 100 includes sealing the injection port in a state where the substrate gap between the element substrate 51 and the counter substrate 52 are properly adjusted. After the injection port is sealed, the thickness of the liquid crystal layer is maintained properly. The substrate gap adjusting device 1 of the present embodiment is such a device that adjusts the substrate gap.

The lower jig 11 which is one of components of the substrate gap adjusting device 1 is provided with a lower jig base 21, a support ring groove 22, a micrometer head passing hole 23, a screw hole 24, a leg portion 25, a mounting section 26, and a support ring 41 serving as 'a ring-shaped support member'. Among them, the support ring 41 is detachable from the lower jig 11. The lower jig base 21 and the leg portion 25, which are formed of metal, serve as a base supporting the substrate gap adjusting device 1. The micrometer head passing hole 23 provided on the lower jig base 21 is such a hole through which a micrometer head 33 to be described below is passed when the lower and upper jigs 11 and 12 are combined. The screw hole 24 serves to fix the lower and upper jigs 11 and 12.

The support ring groove 22, which is provided on the mounting section 26 in accordance with the size of the support ring 41, prevents the support ring 41 from sliding when the support ring 41 is mounted on the lower jig 11. The plurality of support ring grooves 22 are provided so as to form concentric circles of which the diameters are different from each other. Support rings having the same diameter as those circles can be fitted into the support ring grooves 22. The mounting section 26, on which the support ring groove 22 is formed, is formed of a translucent acrylic material and is fixed to the lower jig base 21. The support ring 41 fitted into support ring groove 22 comes into contact with the lower surface 512 of the element substrate 51 so as to support the composite substrate 50. The support ring 41 is formed of a material which is not scratched even though coming in contact with the element substrate 51. For example, metal coated with fluorine resin can be used.

The upper jig 12, which is one of components of the substrate gap adjusting device 1, is provided with an upper jig base 31 serving as 'a second base', a substrate pressing section 32, a micrometer head 33, and a screw 34. The upper jig base 31 formed of metal serves to fix the relative position between the components of the upper jig 12 including the substrate pressing section 32. The upper jig base 31 comes in contact with the lower jig base 21 when the upper jig 12 and the lower jig 11 are combined. At this time, fitting the screw 34 into the screw hole 24 of the lower jig 11 allows the combined lower and upper jigs 11 and 12 to be fixed.

On the upper jig base 31, six of the base pressing sections 32 are attached to be symmetrical with respect to a point so as to have such a shape that a ring having a width is divided into six equal parts, as seen from the normal direction of a plane defined by the upper jig base 31. The micrometer heads 33 serving as 'a rotation input mechanism' which is one embodiment of 'an external force applying section' are connected to the respective substrate pressing sections 32. The substrate pressing section 32 has a movable range in the normal direction of a plane (that is, a plane defined by the support ring 41 when the lower and upper jigs 11 and 12 are combined) defined by the upper jig base 31. Specifically, the substrate pressing section 32 is displaced within the movable range according to the rotation of the micrometer head 33 connected to the substrate pressing section 32, and thus the relative distance with the upper jig base 31 is changed. Further, if the rotation of the micrometer head 33 is stopped, the relative position with the upper jig base 31 is fixed at the position. The pitches between six of the micrometer heads 33 are equal to each other. If amounts of rotation of the micrometer heads 33 are equal to each other, amounts of displacement of the substrate pressing section 32 become equal to each other. One substrate pressing section 32 is displaced depending on the amount of rotation of the micrometer head 33 connected thereto, and is not influenced by the amounts of rotation of the other micrometer heads 33. In other words, the respective substrate pressing sections 32 are displaced independently from each other.

The substrate pressing section 32 comes in contact with the circumferential edge of the upper surface 511 of the element substrate 51 so as to apply a force to the element substrate 51 when the lower and upper jigs 11 and 12 are combined with the composite substrate 50 interposed therebetween. The substrate pressing section 32 is formed of a curable resin which sustains the application of force by which the element substrate 51 can be deformed and has such hardness that the element substrate 51 is not damaged. As an example of such resin, PEEK® (trademark) made by Victrex plc. can be exemplified.

Each of the substrate pressing sections 32 is formed to have such a shape that the contact region with the circumferential edge of the element substrate 51 is arc-shaped toward the inner circumference. The arc-shaped portion substantially coincides with a portion of one circle (not shown) which is concentric with the support ring 41 and the element substrate 51. In other words, the contact region between the substrate pressing section 32 and the element substrate 51 is a portion of the ring-shaped region along the outer circumference of the element substrate 51. In the present embodiment, the contact region is within the range of 3 mm from the outer circumference of the element substrate 51.

Figure 2:
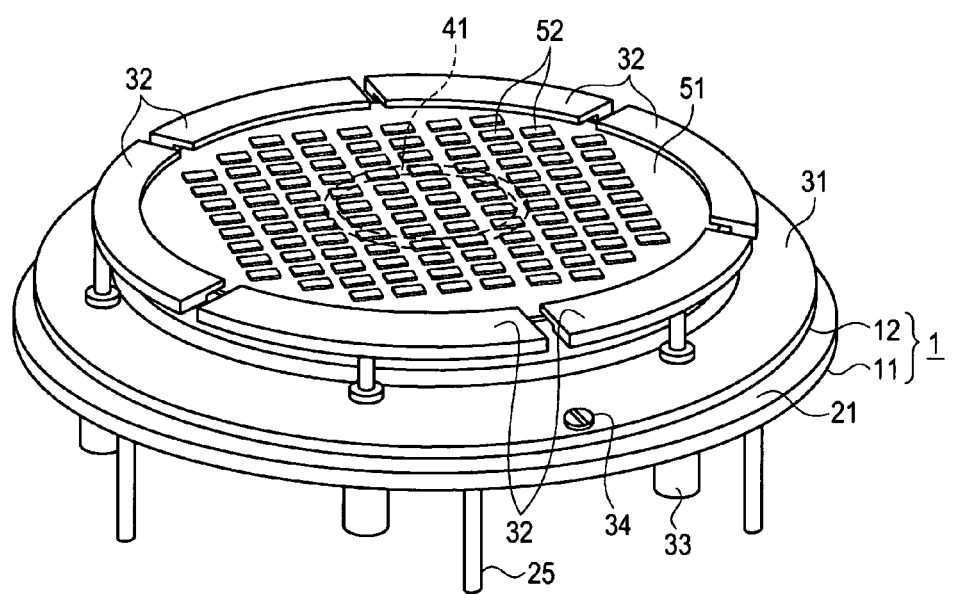
FIG. 2 is a schematic view illustrating the substrate gap adjusting device.
Figure 3A:
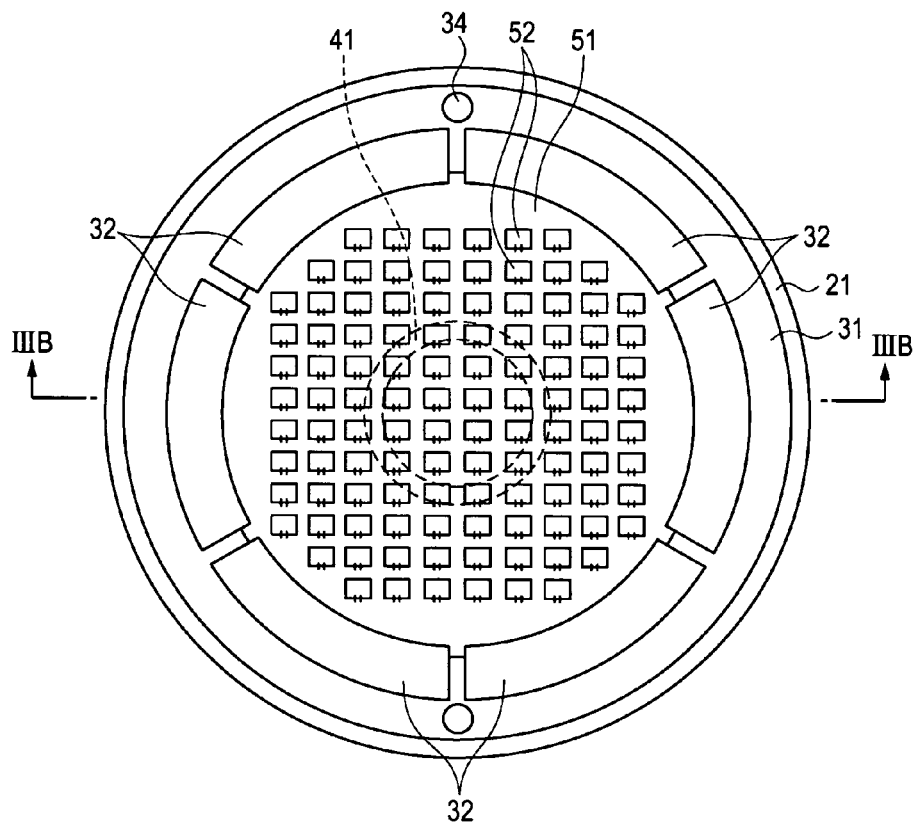
FIG. 3A is a plan view illustrating the substrate gap adjusting device.
Figure 3B:
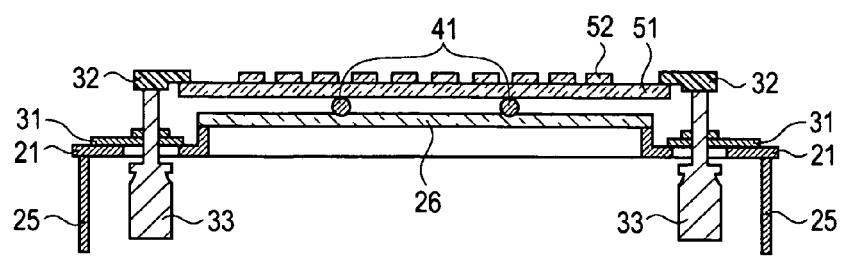
FIG. 3B is a side cross-sectional view illustrating the substrate gap adjusting device.

FIG. 2 and FIGS. 3A and 3B are schematic views illustrating the substrate gap adjusting device 1 in a state where the lower and upper jigs 11 and 12 are combined with the composite substrate 50 interposed therebetween. FIG. 2 is a perspective view illustrating the substrate gap adjusting device 1 in such a state. FIG. 3A is a plan view thereof, and FIG. 3B is a cross-sectional view taken along III-III line of FIG. 3A. The lower and upper jigs 11 and 12 are fixed by the screws 34 in a state where the lower jig base 21 comes in contact with the upper jig base 31. At this time, the element substrate 51 is supported by the support ring 41, and the circumferential edge of the upper surface 511 is pressed by six of the substrate pressing sections 32 so that the element substrate 51 is fixed within the substrate gap adjusting device 1. On the other hand, nothing comes in contact with the counter substrate 52. Further, the normal direction of the plane defined by the support ring 41 is set to be parallel to the direction of the gravity acceleration. The direction of the gravity acceleration is referred to as downward, and the direction opposite thereto is referred to as upward.

In such a state, the substrate gap adjusting device 1 rotates the micrometer heads 33 so that the substrate pressing sections 32 are displaced downward. Then, with the contact place between the element substrate 51 and the support ring 41 being set to a supporting point, a force can be applied to the element substrate 51, concentrated on the contact region between the element substrate 51 and the substrate pressing section 32. At this time, the element substrate 51 is deformed by the application of the force. Specifically, the circumferential edge thereof is displaced downward, and the center portion thereof is slightly displaced upward so as to be deformed (refer to FIGS. 7B and 7E). The substrate pressing sections 32 are deformed independently from each other. Therefore, when forces to be applied to the element substrate 51 are properly set by the respective substrate pressing sections 32, the deformation amount of the element substrate 51 in an arbitrary position can be controlled to a certain extent. If the element substrate 51 is deformed, the substrate gap with the counter substrate 52 disposed to oppose the element substrate 51 changes. Since the deformation amount of the element substrate 51 is different by location, the substrate gap is also different by location. However, if the forces which are applied to the element substrate 51 by the substrate pressing sections 32 are properly set, the substrate gap corresponding to an arranged region can be adjusted into an adequate state at a time.

When the substrate gap is adjusted, the element substrate 51 comes in contact with the support ring 41 and the substrate pressing sections 32. However, the contact place with the support ring 41 is only a circumferentially-shaped region which is determined by the shape of the support ring 41, and the contact region with the substrate pressing sections 32 is only the circumferential edge of the upper surface 511. Further, nothing comes in contact with the counter substrate 52. As such, the substrate gap adjusting device 1 comes in contact only with a minimum portion of the composite substrate 50 when the substrate gap is adjusted. Therefore, the substrate is prevented from being damaged or corrupted. As described above, the substrate gap adjusting device 1 can adjust the substrate gap corresponding to an arranged region at a time, without damaging or corrupting the substrate.

Figure 4:
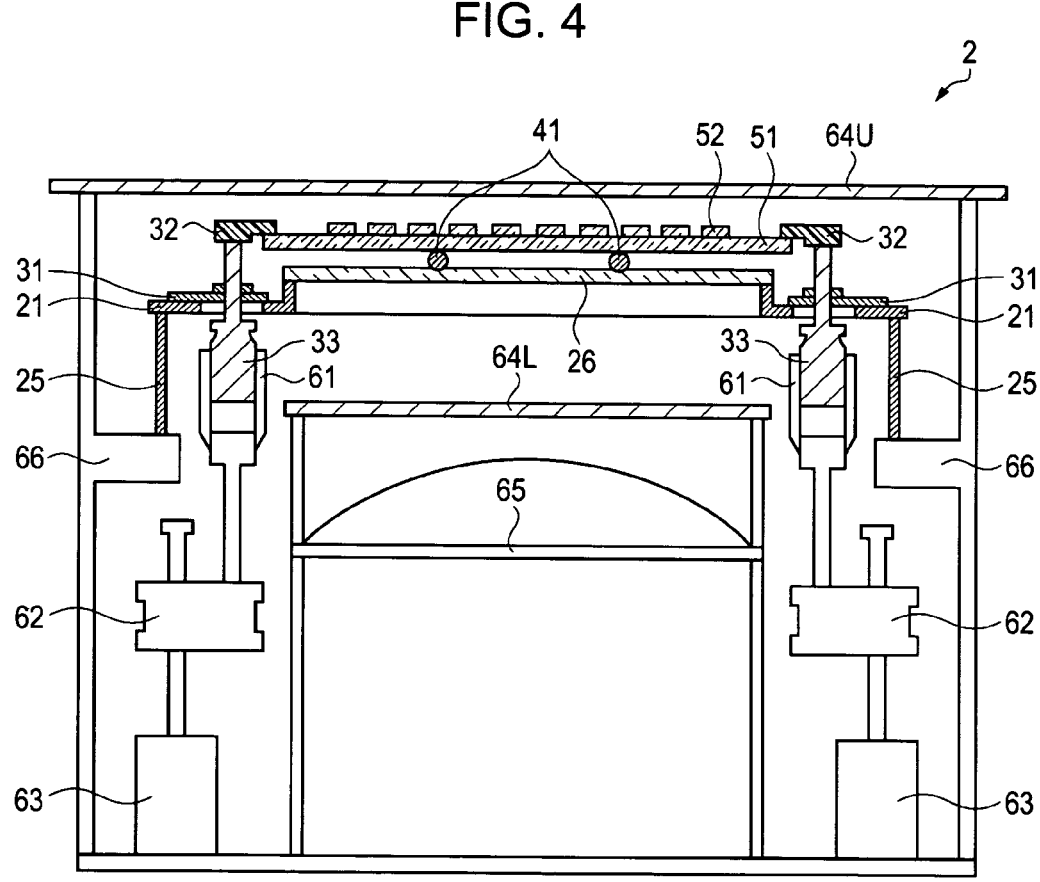
FIG. 4 is a side cross-sectional view illustrating the substrate gap adjusting device and an external driving device.

In the substrate gap adjusting device 1, the substrate gap can be adjusted by manually rotating the micrometer heads 33, even in the above-described state. However, the substrate gap adjusting device 1 of the present embodiment is connected to an external driving device for further enhancing the convenience. FIG. 4 is a schematic cross-sectional view illustrating the substrate gap adjusting device in a state where the external driving device 2 is connected thereto. The external driving device 2 is provided with a driving unit composed of a hand 61, a hand lifting/rotating mechanism, and a motor 63, a polarizing plate 64L serving as 'a first polarizing plate', a polarizing plate 64U serving as 'a second polarizing plate', a light source 65, and a supporting wall 66. The external driving device 2 has a function of rotating the micrometer head 33 and a lighting function for checking the adjustment of a substrate gap.

The driving unit serves to rotate the micrometer heads 33. Among the components of the driving unit, the motor 63 is electrically connected to a processing section 69 (refer to FIG. 5) through a motor driving section 68 (refer to FIG. 5), and is mechanically connected to the lifting/rotating mechanism 62. The motor 63 is a device which generates a rotation driving force in accordance with an instruction of the motor driving section 68. The lifting/rotating mechanism 62 is electrically connected to the processing section 69 through a lifting/rotating mechanism driving section 67 (refer to FIG. 5), and is mechanically connected to the hand 61. The lifting/rotating mechanism 62 transmits the rotation driving force generated by the motor 63 to the hand 61, thereby rotating the hand 61. Further, the lifting/rotating mechanism 62 ascends and descends along a supporting post vertically extending from the motor 63, thereby lifting the hand 61 up and down. With the lifting/rotating mechanism 62 ascending, the hand 61 moves to the position where it can hold the micrometer head 33. In this case, air injected into the hand 61 is expanded to press the micrometer head 33, so that the hand 61 holds the micrometer head 33. The driving units are installed to respectively correspond to six substrate pressing sections 32 and six micrometer heads 33, and operate independently from each other.

Figure 5:
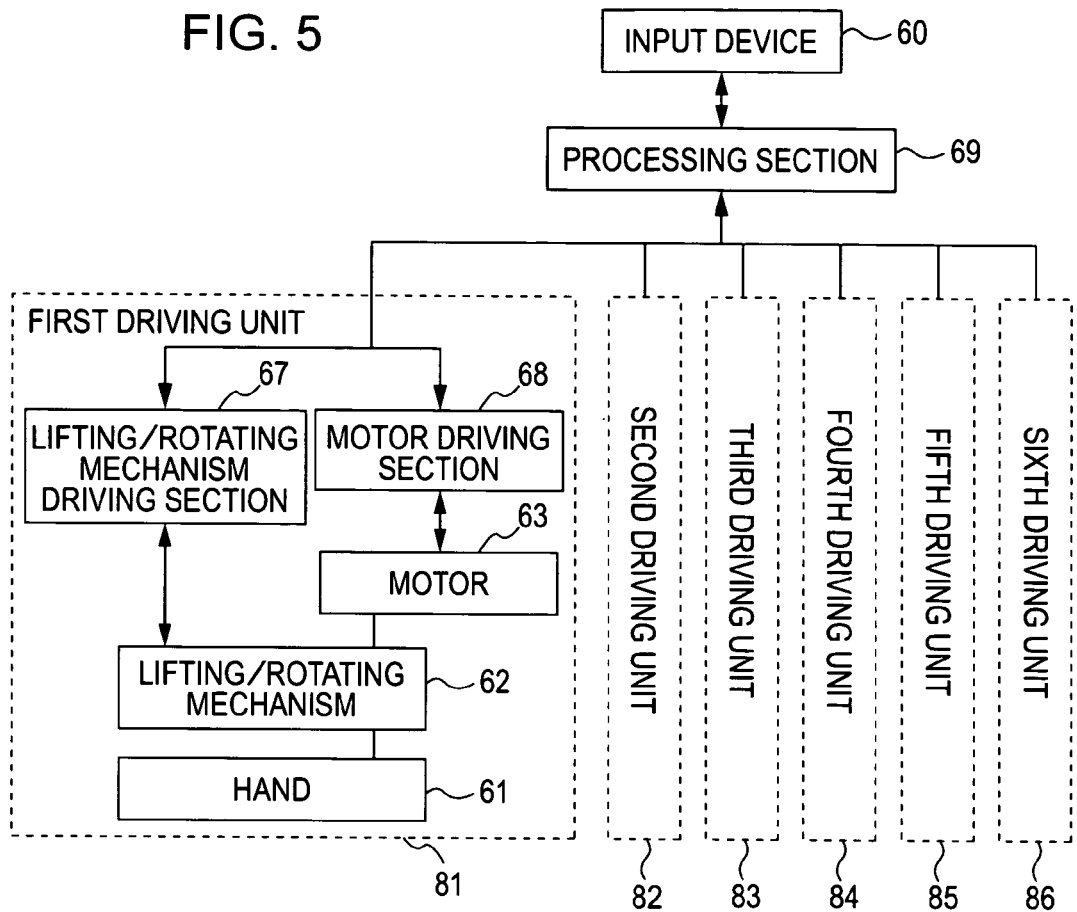
FIG. 5 is a block diagram showing the electrical construction of the external driving device.

Referring to FIG. 5, the electrical construction of the driving unit will be described. In FIG. 5, only the electrical construction of the first driving unit 81 is shown in detail among six driving units 81 to 86. However, the electrical constructions of the remaining driving units 82 to 86 are the same as that of the first driving unit. In a state where the substrate gap adjusting device 1 is set in a predetermined position, if a start signal is transmitted from an input device 60 to the processing section 69, the processing section 69 instructs the lifting/rotating mechanism driving section 67 to lift the lifting/rotating mechanism 62. The lifting/rotating mechanism driving section 69 receiving the instruction lifts the lifting/rotating mechanism 62 and the hand 61 connected thereto up to the position where the hand 61 can hold the micrometer head 33. When the lifting/rotating mechanism 62 and the hand 61 connected thereto are completely lifted, air injected into the hand 61 is expanded to press the micrometer head 33, so that the hand 31 holds the micrometer head 33. In this state, if an instruction on the displacement amount of the substrate pressing section 32 is input into the input device 60, the processing section receiving the instruction converts the displacement amount into the rotation amount of the motor 63 so as to instruct the motor driving section 68 to rotate the motor 63. The motor driving section 68 receiving the instruction rotates the motor 63 as much as the instructed rotation amount. At this time, the lifting/rotating mechanism 62 transmits the rotation driving force of the motor 63 to the hand 61, thereby rotating the hand 61 and the micrometer head 33 held thereby. In accordance with this, the substrate pressing section 32 is displaced as much as an amount corresponding to the rotation amount of the micrometer head 33. As such, the first driving unit 81 rotates the micrometer head 33 according to the displacement amount of the substrate pressing section 32 which is input from the input device 60. The above-described operation is performed independently in six of the driving units 81 to 86.

Returning to FIG. 4, other components of the external driving device 2 will be described. The supporting wall 66 supports the leg portion 25 of the lower jig 11 so as to support the substrate gap adjusting device 1. In the lower position corresponding to the mounting section 26 of the substrate gap adjusting device 1 installed in this state, the light source 65 is disposed. Further, the polarizing plate 64L is disposed between the light source 65 and the substrate gap adjusting device 1, and the polarizing plate 64U is disposed above the substrate gap adjusting device 1.

The light source 65 and the polarizing plate 64L and 64U are components for checking the adjustment of a substrate gap. Light emitted upward from the light source 65 passes through the polarizing plate 64L, the mounting section 26 of the substrate gap adjusting device 1, the composite substrate 50, and the polarizing plate 64U in the mentioned order, and is then checked by an operator. In the transmitted light, the light passing through the liquid crystal layer included in the composite substrate 50 is colored according to the retardation of the liquid crystal layer. Specifically, the light passing through the polarizing plate 64L changes from linearly-polarized light to elliptically-polarized light when passing through the liquid crystal layer, according to the magnitude of the retardation which is determined by a product of the thickness of the liquid crystal layer and the refractive index anisotropy which is a unique parameter of the liquid crystal layer. The thickness of the crystal layer is a gap between the element substrate 51 and the counter substrate 52. The shape of the ellipse differs for each wavelength. Therefore, if the elliptically-polarized light again passes through the polarization plate 64U so that only one polarization axis component is extracted, the intensity distribution at each wavelength changes from that of the incident light, and thus the light is colored. As such, since the polarization state of the elliptically-polarized light depends on the gap between the element substrate 51 and the counter substrate 52, the color of the transmitted light which is checked by an operator changes according to the substrate gap. Comparing the color of the transmitted light with the color as a reference when light passes through a region with a proper substrate gap, the operator can determine whether a substrate gap in a certain region is adjusted into an adequate state.

As described above, the substrate gap adjusting device 1 connected to the external driving device 2 has a function of rotating the micrometer head 33 of the substrate gap adjusting device 1 on the basis of the input displacement amount of the substrate pressing section 32, and has a lighting function for checking the adjustment of a substrate gap. An operator can effectively adjust a substrate gap by using the substrate gap adjusting device 1 having such functions.

B. Substrate Gap Adjusting Method

Figure 6:
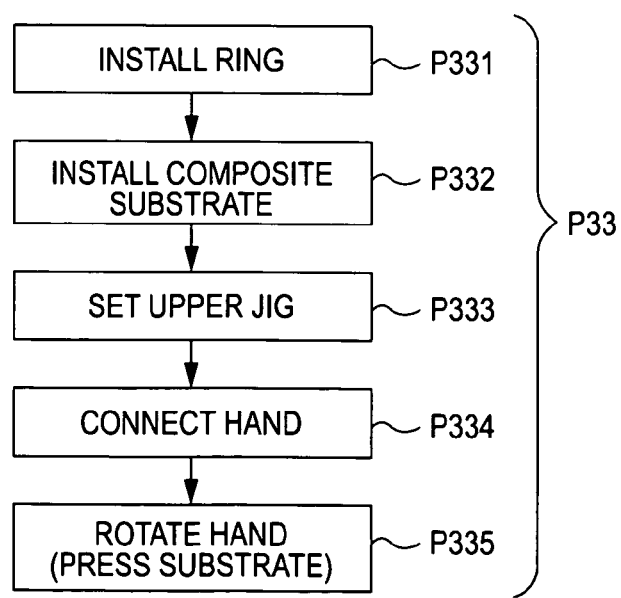
FIG. 6 is a process chart showing a procedure of adjusting a substrate gap.

A method of adjusting a substrate gap by using the above-described substrate gap adjusting device 1 and external driving device 2 will be described with reference to FIG. 6 and FIGS. 7A to 7E. FIG. 6 is a process chart showing a substrate gap adjusting procedure of the present embodiment, and FIGS. 7A to 7E are cross-sectional views illustrating the substrate gap adjusting device 1 in each process of FIG. 6. The substrate-gap adjusting method of the present embodiment has processes P331 to P335. Hereinafter, the processes P331 to P335 are collectively referred to as a process P33.

In the process P331, the support ring 41 is mounted on the support ring groove 22 provided on the mounting section 26 of the lower jig base 21 (refer to FIG. 7A).

In the process P332, the composite substrate composed of the element substrate 51 and the counter substrates 52 is installed on the support ring 41 mounted in the process 331, with the element substrate 51 being set downward (refer to FIG. 7B). As described above, the overall element substrate 51 is bent, and the circumferential edge thereof is relatively higher than the center thereof.

Figure 7C:
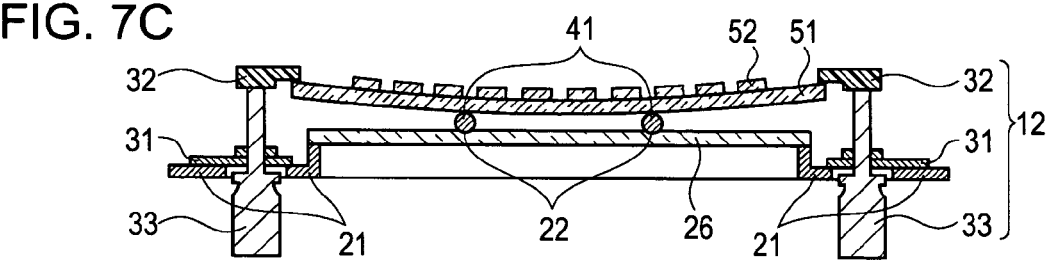

In the process P333, the upper jig 12 provided with the upper jig base 31, the substrate pressing sections 32, and the micrometer heads 33 is combined with the lower jig 11 so that the lower and upper jigs 11 and 12 are fixed to each other (refer to FIG. 7C). In this process, the substrate pressing sections 32 are caused to come in contact with the circumferential edge of the upper surface 511 (refer to FIG. 1) of the element substrate 51.

Figure 7D:
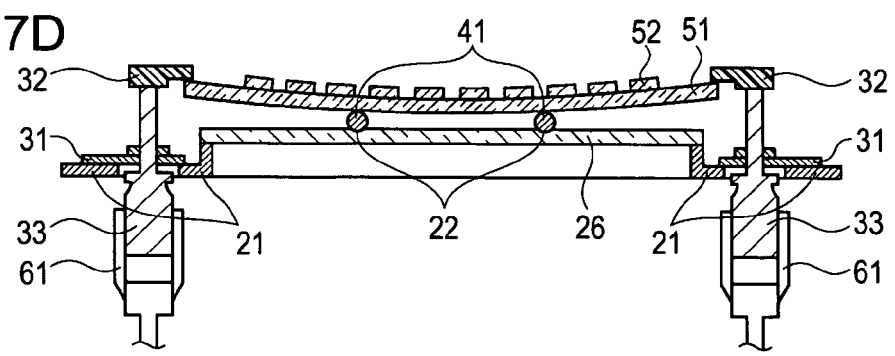

In the process P334, the hand 61 included in the above-described external driving device 2 is connected to the micrometer head 33 (refer to FIG. 7D). Since the operation of the external driving device 2 at the time of the connection has been already described in detail, the description thereof will be omitted.

Figure 7E:
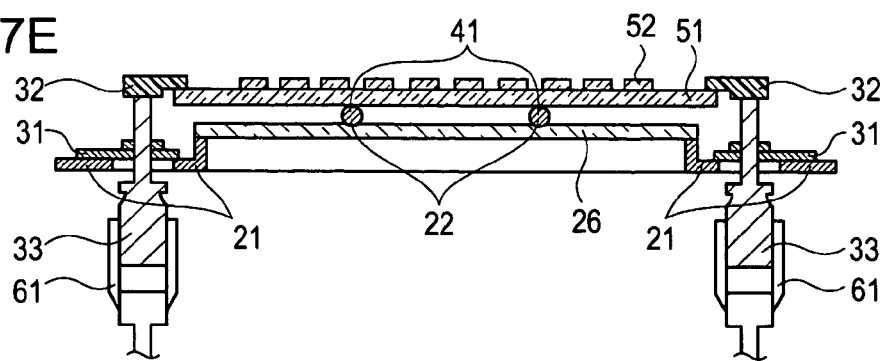

In the process P335, with the rotation of the hand 61, the micrometer head 33 is rotated so as to displace the substrate pressing section 32 downward. Accordingly, with the contact place between the element substrate 51 and the support ring 41 being set to a supporting point, a force is applied to the element substrate 51, concentrated on the contact region between the element substrate 51 and the substrate pressing section 32 (refer to FIG. 7E). At this time, the element substrate 51 is deformed by the application of the force. Specifically, with the circumferential edge of the element substrate 51 being deformed downward, the center thereof is slightly deformed upward, as shown in FIG. 7E. That is, the center is deformed in the direction where the above-described bending is released. If the bending of the element substrate 51 is released so that the element substrate 51 becomes substantially flat, the substrate gap between the element substrate 51 and the counter substrate 52 is properly adjusted in a portion of the region where the substrate gap has been deviated from its proper value due to the bending. Although the bending of the element substrate 51 is not uniform but complex, the forces which are applied to the element substrate 51 by the respective substrate pressing sections 32 are properly set, so that the element substrate 51 can be deformed to be substantially flat as a whole. Accordingly, even on the composite substrate 50 having the element substrate 51 which is bent in a complex shape, the substrate gap corresponding to an arranged region can be adjusted at a time.

As shown in FIG. 7E, the element substrate 51 comes in contact with the support ring 41 and the substrate pressing section 32, when the substrate gap is adjusted. In this case, the contact place with the support ring 41 is only a circumferentially-shaped region which is determined from the shape of the support ring 41, and the contact place with the substrate pressing section 32 is only the circumferential edge of the upper surface 511. Further, nothing comes in contact with the counter substrate 52. Therefore, according to the substrate gap adjusting method of the present embodiment, a substrate gap corresponding to an arranged region can be adjusted without the composite substrate being damaged or corrupted.

C. Method of Manufacturing a Liquid Crystal Display Device

Figure 8:
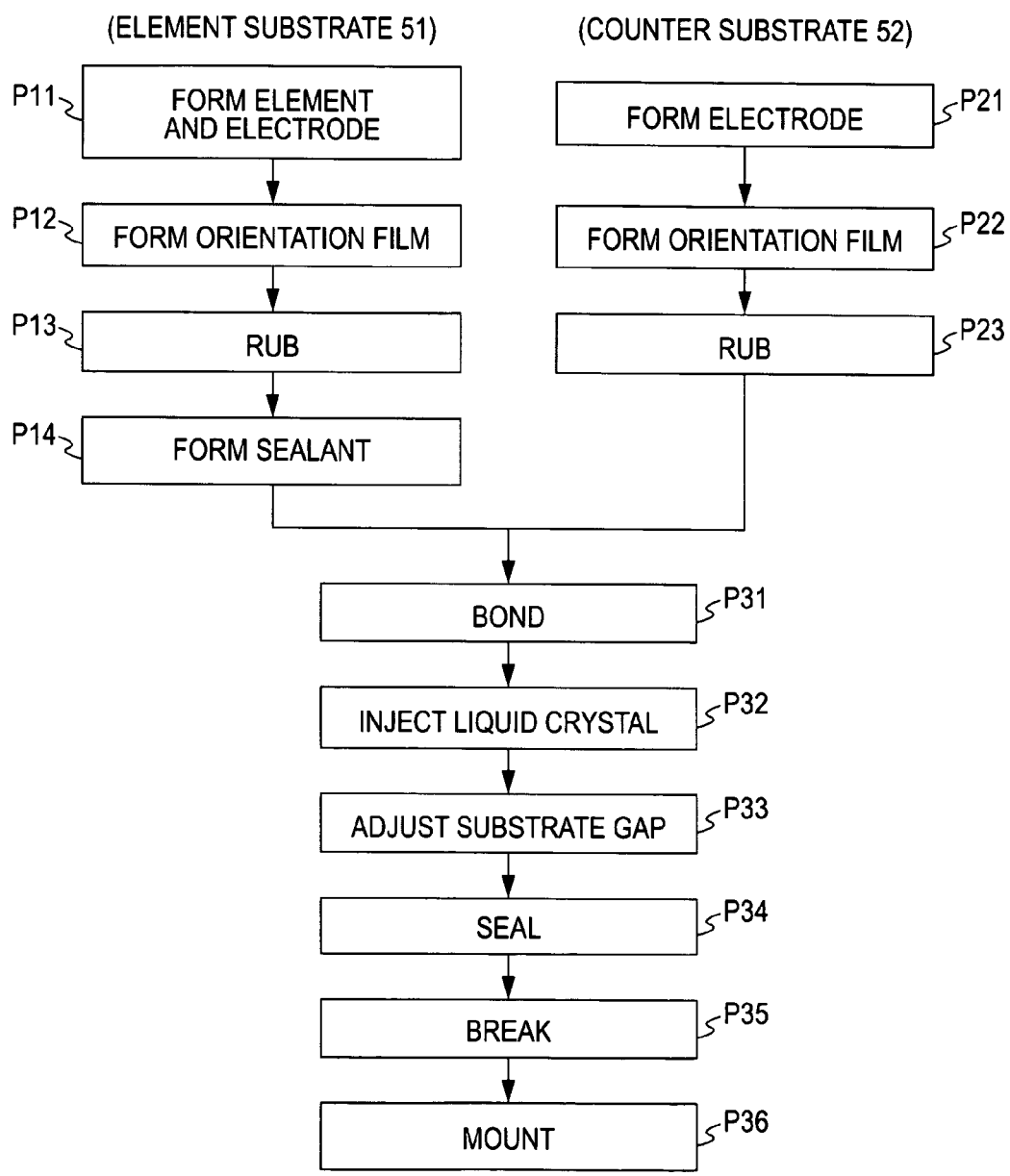
FIG. 8 is a process chart showing a procedure of manufacturing a liquid crystal display device.

A method of manufacturing a liquid crystal display device including the above-described substrate gap adjusting method will be described with reference to FIG. 8. FIG. 8 is a process chart showing a procedure of manufacturing the liquid crystal display device of the present embodiment. Referring to FIG. 8, the element substrate 51 is formed in processes P11 to P14, and the counter substrate 52 is formed in processes P21 to P23. Further, in processes P31 to 36, the element substrate 51 and the counter substrate 52 are combined to complete the liquid crystal display device 100. The processes P11 to P14 and the processes P21 to P23 are performed independently.

In the process P11, components including a TFT transistor, metal wiring lines, and a transparent electrode are laminated on the surface of a disc-shaped quartz glass substrate which is a base material of the element substrate 51. Those components corresponding to the plurality of liquid crystal display devices 100 are formed on one sheet of quartz glass substrate. The process is performed by a photolithographic method, for example.

In the process P12, an orientation film which is formed of polyimide by a flexographic method is formed over the components formed in the process P11.

In the process P13, the surface of the orientation film formed in the process P12 is rubbed with cloth, which is referred to as the rubbing. The orientation film subjected to the rubbing has a function of orienting liquid crystal coming in contact therewith in the direction of the rubbing.

In the process P14, a sealant is coated on the surface rubbed in the process P13 by a screen printing method. The sealant is coated on the circumferential edge of a region where the counter substrate 52 is bonded, except for a portion becoming an injection port for the crystal injection which will be described below. In other words, the sealant is coated in a circumferential shape where an opening serving as the injection port is provided. Through the processes P11 to P14, the element substrate 51 is completed.

In the process P21, a transparent electrode is formed on the surface of a glass substrate which is a base material of the counter substrate 52. This process is performed by a photolithographic method, for example.

In the process P22, an orientation film which is formed of polyimide by a flexographic printing method is formed over the transparent electrode formed in the process P21.

In the process P23, the surface of the orientation film formed in the process P22 is rubbed with cloth, which is referred to as the rubbing. The orientation film subjected to the rubbing has a function of orienting liquid crystal coming in contact therewith in the direction of the rubbing. Through the processes P21 to P23, the counter substrate 52 is completed.

As in the present embodiment, when the counter substrate 52 is manufactured to have a size corresponding to one liquid crystal display device with a diagonal width of 1 to 2 inches, the transparent electrodes and orientation films corresponding to the plurality of counter substrates 52 are formed on a large glass substrate, that is, through the processes P21 to P23. Then, the transparent electrodes and orientation films are cut into a predetermined size.

In the process 31, the counter substrate 52 is bonded on the element substrate 51 through the sealant to thereby form the composite substrate 50. The bonding is performed as follows. In a state where the alignment (positioning) between the element substrate 51 and the counter substrate 52 has been performed, the element substrate 51 and the counter substrate 52 come in contact with and are pressure-bonded to each other. After that, the sealant is dried.

In the process P32, liquid crystal is injected into a region which is surrounded by the element substrate 51, the counter substrate 52, and the sealant. In this process, liquid crystal is dropped into the above-described injection port under vacuum so as to be introduced into the region through a capillary phenomenon.

In the process P33, the gap between the element substrate 51 and the counter substrate 52 is adjusted by using the substrate gap adjusting device 1. This process includes the above-described processes P331 to P335. Since the respective process P331 to P335 have been already described in detail, the descriptions thereof will be omitted in order to avoid the repetition.

In the process P34, the injection port is sealed in the region where the substrate gap has been properly adjusted in the process P33. The sealing is performed as follows: ultraviolet curing resin is coated on the injection port, that is, a portion corresponding to the opening of the sealant, and is then cured by irradiating ultraviolet rays. The sealing is not performed on a region where the substrate gap has not been properly adjusted in the process P33. Returning to the process P33, the substrate gap of the corresponding region is adjusted into a proper state, and then the sealing is further performed.

In the process P35, the composite substrate 50 in which the liquid crystal injection and the sealing have been completed is broken into a shape corresponding to each of the liquid crystal display devices 100, thereby manufacturing a composite substrate 50'. The braking is performed as follows: a scribing groove is formed on the surface of the element substrate 51, and the element substrate 51 is cut at the position of the scribing groove. The composite substrate 50' has an element substrate 51' obtained by cutting the element substrate 51 and the counter substrate 52.

In the process 36, an FPC (flexible printed circuit) 71 (refer to FIG. 12A) for electrical connection with the outside, dust-proof glass 72 (refer to FIG. 12A) for preventing foreign matters from being adhered on the surface of the composite substrate 50', and a cover 73 (refer to FIG. 12B) for protecting the composite substrate 50' and radiating heat are mounted on the composite substrate 50' obtained in the process P35. Through the above processes, the liquid crystal display device 100 is manufactured.

According to the manufacturing method of the liquid crystal display device 100 as described above, the sealing can be performed in a state where the substrate gap corresponding to an arranged region is adjusted, without the substrate being damaged or corrupted. This characteristic allows the liquid crystal display device 100 to be manufactured at a high yield rate. Further, since the substrate gap corresponding to a plurality of single parts can be adjusted at a time, the liquid crystal display device 100 can be manufactured in a short manufacturing time.

Although the embodiment of the invention has been described so far, various changes and modifications in form and detail with respect to the embodiment may be made therein without departing from the scope of the present invention. As a modified example, the following examples are considered.

FIRST MODIFIED EXAMPLE

Figure 9A:
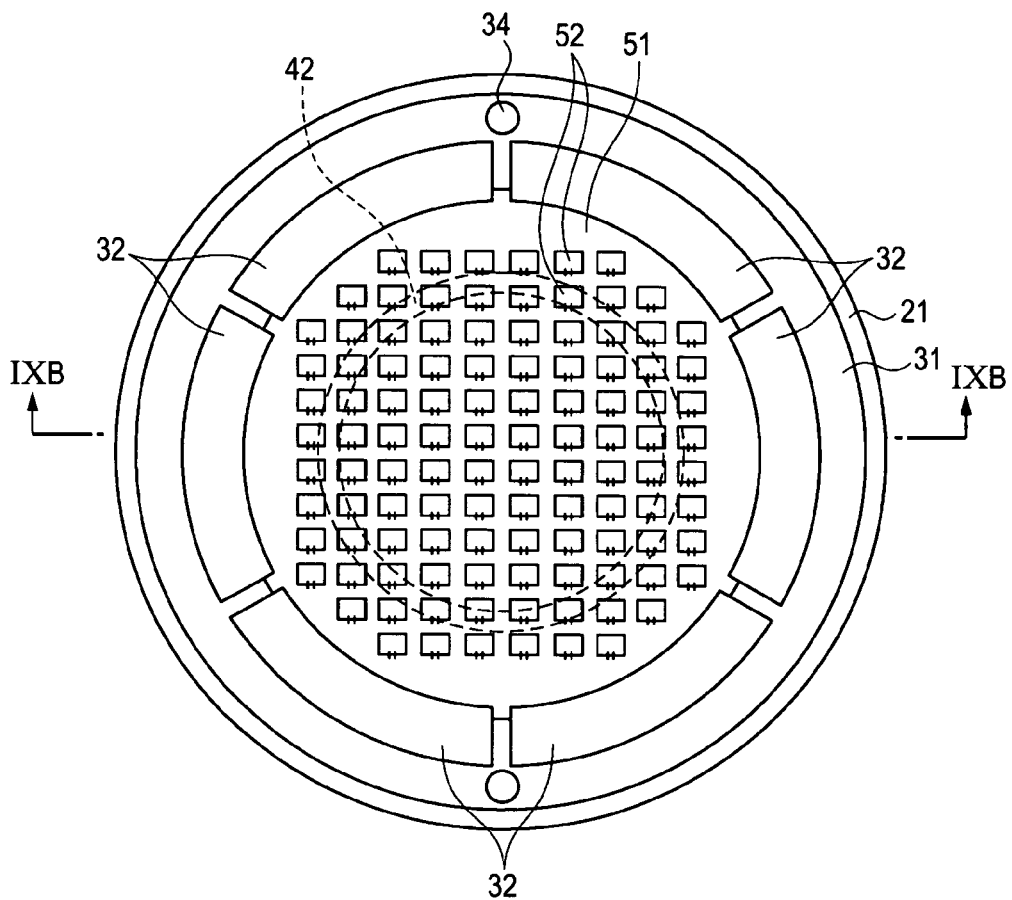
FIG. 9A is a plan view illustrating the substrate gap adjusting device.
Figure 9B:
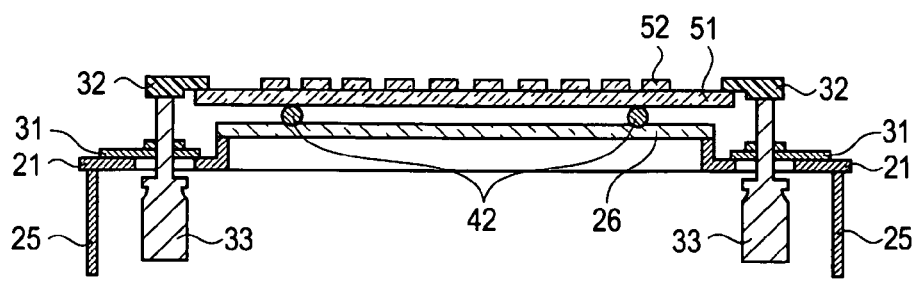
FIG. 9B is a side cross-sectional view illustrating the substrate gap adjusting device.

Instead of the support ring 41 in the above-described embodiment, a support ring having a different diameter from the support ring 41 may be used. FIG. 9A is a plan view illustrating the substrate gap adjusting device 1 when a support ring 42 having a larger diameter than the support ring 41 is used. FIG. 9B is a cross-sectional view taken along the line IX-IX of FIG. 9A. The support ring 42 has the same feature as the support ring 41, except for the diameter. In a case where the composite substrate 50 is supported by such a support ring 42 and a force is applied to the circumferential edge of the element substrate 51 by the substrate pressing section 32, a supporting point when the force is applied differs from that of the present embodiment. Therefore, the element substrate 51 is deformed in a different state from the present embodiment, and a substrate gap can be properly adjusted in a region which is different from the present embodiment. Moreover, instead of the support ring 42, a support ring having a smaller diameter than the support ring 41 may be used.

The diameter of the support ring to be used can be selected according to the shape feature including a bending condition of the element substrate 51. Alternately, using a support ring with a certain diameter, the substrate gap is first adjusted so as to perform the sealing with respect to the same element substrate 51. Then, using a support ring with a different diameter from the above support ring, the adjustment may be consecutively performed in a region where the substrate gap could not be properly adjusted. For example, the support ring 41 is first used to adjust the substrate gap, and the support ring 42 can be then used to adjust the substrate gap. Further, a support ring with a different diameter from any one of the support rings 41 and 42 may be used. According to the present modified example, a substrate gap can be adjusted with respect to a wide region in the composite substrate 50 having the element substrate 51 with various shapes.

SECOND MODIFIED EXAMPLE

Figure 10A:
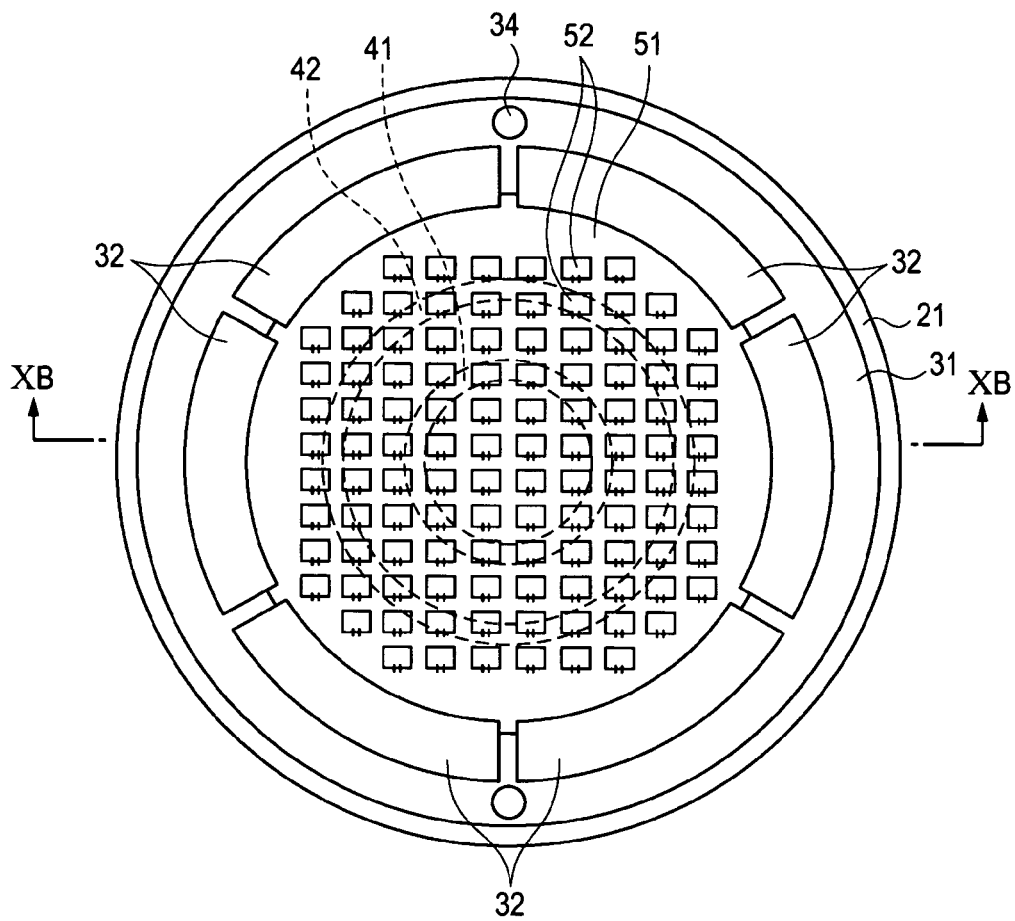
FIG. 10A is a plan view illustrating the substrate gap adjusting device.
Figure 10B:
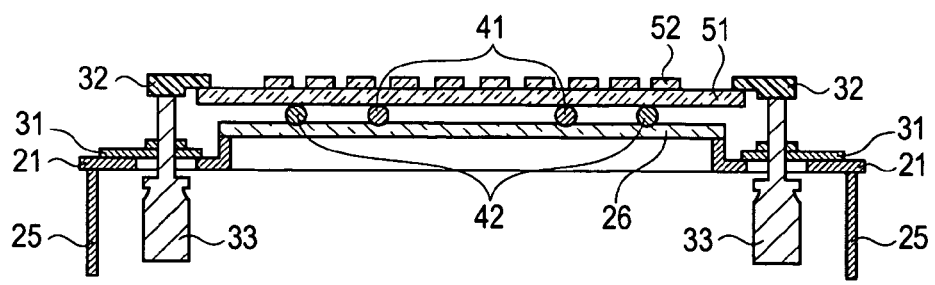
FIG. 10B is a side cross-sectional view illustrating the substrate gap adjusting device.

In the above-described embodiment, the composite substrate 50 is supported by one support ring 41 so that a substrate gap is adjusted. However, two more than support rings having different diameters are simultaneously used to perform the adjustment. FIG. 10A is a plan view illustrating the substrate gap adjusting device 1 when the support ring 41 and the support ring 42 having a larger diameter than the support ring 41 are simultaneously used. FIG. 10B is a cross-sectional view taken along the line X-X of FIG. 10A.

Figure 11A:
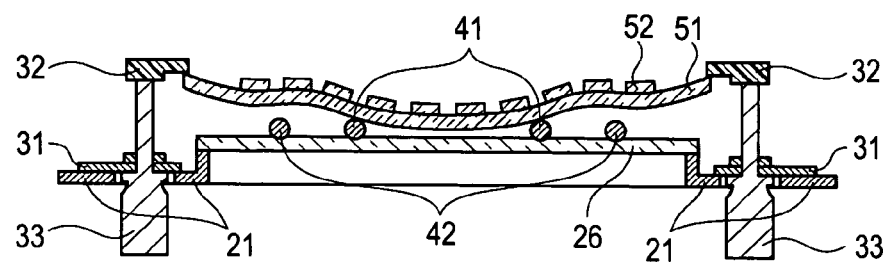
FIGS. 11A and 11B are side cross-sectional views showing a substrate gap adjusting method using the substrate gap adjusting device shown in FIGS. 10A and 10B.

A method of adjusting a substrate gap with respect to the composite substrate 50 having the element substrate 51 which is bent in a complex shape by using the substrate gap adjusting device 1 will be described with reference to FIGS. 11A and 11B. As shown in FIG. 11A, the element substrate 51 fixed in the substrate gap adjusting device 1 has a complex shape where the overall element substrate 51 is bent and some portions thereof are deformed in the reverse direction to the bending. Further, the element substrate 51 is supported by the support ring 41 having a smaller diameter, between two support rings. Here, when the substrate pressing section 32 is displaced downward, a force can be applied to the element substrate 51, with the contact place between the corresponding substrate and the support ring 41 being set to a supporting point. As such, the element substrate 51 is deformed, so that a substrate gap corresponding to a certain arranged region can be adjusted into a proper state. In the region where the substrate gap is adjusted into a proper state, sealing is performed at this time.

Figure 11B:
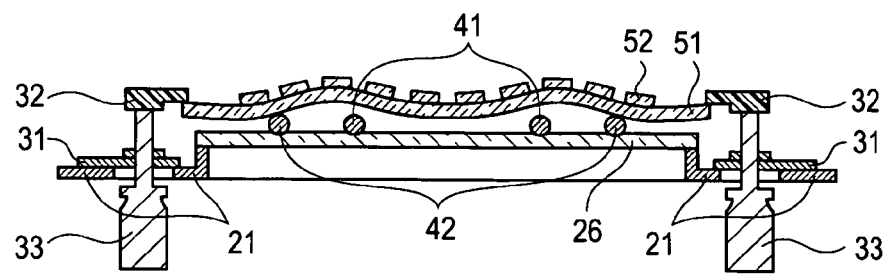

If a force is further applied so as to deform the element substrate 51, the element substrate 51 is separated from the support ring 41 so as to come in contact with the support ring 42 having a larger diameter than the support ring 41, as shown in FIG. 11B. At this time, the force is applied to the element substrate 51, with the contact place between the corresponding substrate and the support ring 41 being set to a supporting point. Therefore, the element substrate 51 is deformed in a different shape from when the element substrate 51 comes in contact with the support ring 41. Accordingly, if the displacement amount of the substrate pressing section 32 is properly set, the substrate gap can be adjusted even on a region in which the substrate gap could not be adjusted in a state where the element substrate 51 comes in contact with the support ring 41. On the region where the substrate gap is newly adjusted, sealing is performed at this time. As such, when two support rings having different diameters are used, a substrate gap can be adjusted even on the composite substrate 50 having the element substrate 51 which is bent in a complex shape.

THIRD MODIFIED EXAMPLE

In the above-described embodiment, the micrometer head 33 is set to a rotation input mechanism which is one embodiment of an external force applying section, and the substrate pressing section 32 is displaced by rotating the micrometer head 33. However, the construction of a mechanism displacing the substrate pressing section 32 and the external force applying section which applies an external force for the displacement is not limited thereto. Various constructions can be used.

For example, the substrate pressing section 32 may be connected to an air cylinder serving as the external force applying section. In this case, sending compressed air to the air cylinder allows an external force to be applied. In accordance with an accompanied operation of the air cylinder, the substrate pressing section 32 is deformed. Alternately, the substrate pressing section 32 may be connected to a piezoelectric actuator serving as an external force applying section. In this case, a voltage applied to the piezoelectric actuator displaces the piezoelectric actuator, so that the substrate pressing section 32 connected thereto can be displaced.

FOURTH MODIFIED EXAMPLE

In the above-described embodiment, a circle defined by the circumference of the element substrate 51 and a circle defined by the support ring 41 are disposed to be concentric with each other, in order to adjust the substrate gap. However, the centers of the circles may not coincide with each other. For example, the support ring 41 can be installed so as to be purposely shifted from the center of the element substrate 51. Specifically, there is such a case that a substrate gap is desired to be adjusted on the composite substrate 50 including the substantially-circular element substrate 51 which is asymmetrically bent with respect to the center, or that a substrate gap is desired to be adjusted only on a portion which is biased from the center of the element substrate 51. In such a case, the centers of the support ring 41 and the element substrate 51 are disposed to be shifted, so that the substrate gap can be adjusted into a desired state.

FIFTH MODIFIED EXAMPLE

In the above-described embodiment, the circular-ring-shaped support ring 41 serving as a ring-shaped support member is used to adjust a substrate gap with respect to the composite substrate 50 including the substantially-circular element substrate 51. However, the shapes of the ring-shaped support member and the substrate are not limited thereto, but various shapes can be used according to a use. For example, a rectangular-ring-shaped support member can be used to adjust a substrate gap with respect to a composite element including a rectangular substrate. In this case, the substrate pressing section 32 is constructed in a shape where it can come in contact with the circumferential edge of the rectangular substrate. 'The ring-shaped support member' in the present invention can be formed in various shapes such as a hexagonal ring shape, an octagonal ring shape, and the like in addition to the above-described circular ring shape and rectangular ring shape, if the ring-shaped support member forms a closed circumference.

SIX MODIFIED EXAMPLE

In the above-described embodiment, liquid crystal is injected after bonding the substrate, and the opening of the sealant is sealed to enclose the liquid crystal. Instead of this, liquid crystal may be filled by a liquid crystal dropping method in which a sealing operation is not needed.

Figure 13A:
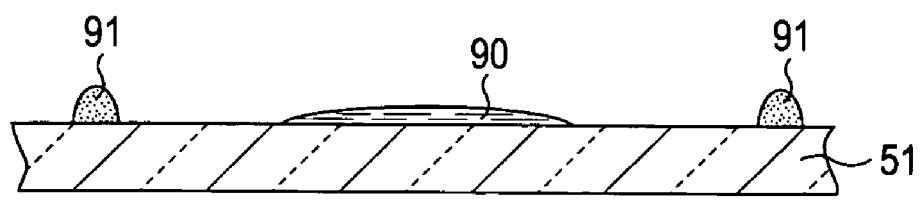
FIGS. 13A and 13B are cross-sectional views showing a liquid crystal filling method according to a liquid crystal dropping method.
Figure 13B:
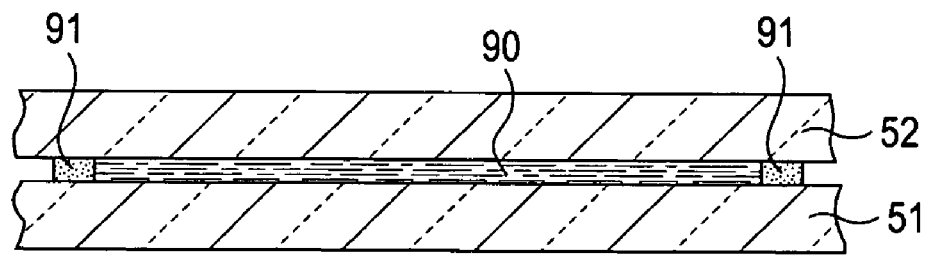

The liquid crystal dropping method will be described with reference to cross-sectional views of FIGS. 13A and 13B. First, on the element substrate 51, a sealant 91 is coated on a region formed in a closed circumference, and a proper amount of liquid crystal 90 is dropped into the portion surrounded by the sealant 91 (FIG. 13A). Next, the counter substrate 52 is bonded to the element substrate 51 through the sealant 91 (FIG. 13B). Accordingly, the liquid crystal 90 is filled in the region surrounded by the element substrate 51, the counter substrate 52, and the sealant 91. That is because the sealant 91 is coated in the form of a closed circumference and the opening is not present. The proper amount of the liquid crystal 90 is such an amount that the liquid crystal 90 filled between the substrates becomes a layer having an optimum thickness.

Figure 14:
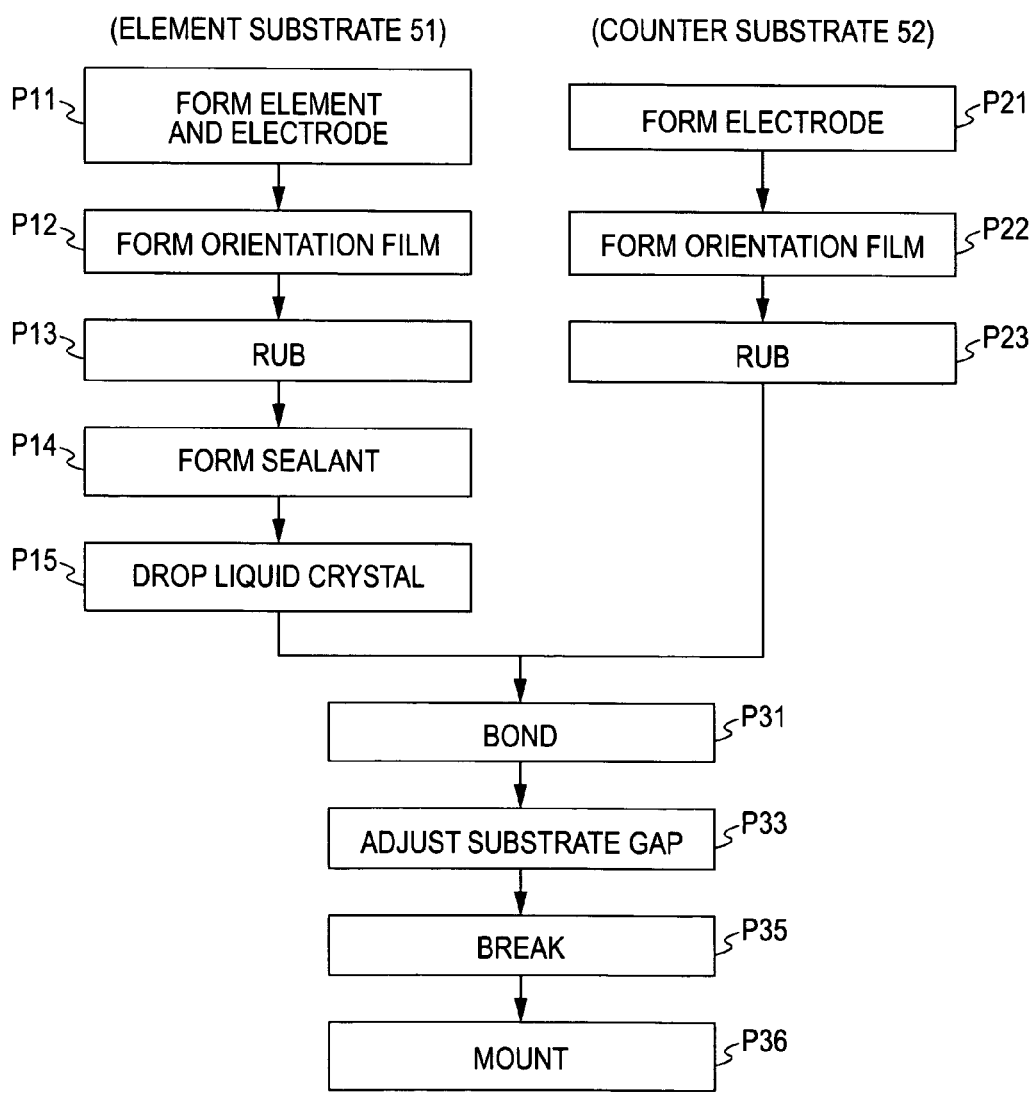
FIG. 14 is a process chart showing a procedure of manufacturing a liquid crystal display device using a liquid crystal dropping method.

A manufacturing method of a liquid crystal display device according to the present modified example will be described with reference to a process flow of FIG. 14. The manufacturing method of the present modified embodiment is different from the manufacturing method of the above embodiment (refer to FIG. 8) only in the following aspects. That is, the counter substrate 52 and the element substrate 51 have the substantially same size, components corresponding to the plurality of liquid crystal display devices 100 are formed, a region where the sealant is coated differs in the process P14, a liquid crystal dropping process (process P15) after the process P14 is present, a liquid crystal injecting process is not present after the substrates are bonded in the process P31, and a sealing process is not present after a substrate gap is adjusted in the process P33. Hereinafter, those differences will be described in priority.

In the manufacturing processes of the element substrate 51, the processes P11 to P13 are performed the same as those of the above embodiment. In the following process P14, the sealant 91 is coated on the surface rubbed in the process P13 by a screen printing method or dispenser coating method. The sealant 91 is coated in a closed circumference shape on the circumferential edge of a region where the counter substrate 52 is bonded. In other words, the sealant 91 is coated, without an opening as an injection port being provided.

In the process P15, the liquid crystal 90 is dropped into the portion surrounded by the sealant 91 on the element substrate 51. In this process, the liquid crystal 90 is dropped by a liquid droplet discharge device. As described above, a dropping amount of the liquid crystal 90 is such an amount that the liquid crystal 90 filled between the substrates becomes a layer having an optimum thickness when the counter substrate 52 is bonded. Through the processes P11 to P15, the element substrate 51 is completed.

The manufacturing processes of the counter substrate 52 from the process P21 to the process P23 are performed the same as those of the above embodiment.

In the process P31, the element substrate 51 and the counter substrate 52 are bonded to each other through the sealant 91, thereby forming the composite substrate 50. In this process, the filling of the liquid crystal 90 is performed at the same time, as described above.

In the next process P33, the substrate gap adjusting device 1 is used to adjust the gap between the element substrate 51 and the counter substrate 52. This process includes the above-described processes P331 to P335. Since the respective processes P331 to P335 have been already described in detail, the descriptions thereof will be omitted, in order to avoid the repetition. In the process P33, a force is applied to slightly displace the element substrate 51 or the counter substrate 52, so that the substrate gap between the element substrate 51 and the counter substrate 52 is adjusted. The process P33 may be performed together with the substrate bonding process (the process P31).

The remaining processes P35 and P36 are performed the same as those of the above embodiment. However, the breaking in the process P35 is performed by cutting both the element substrate 51 and the counter substrate 52. Through the above processes, the liquid crystal display device 100 is manufactured.

According to the manufacturing method of the liquid crystal display device 100 as described above, the substrate gap corresponding to the arranged region within the element substrate 51 can be adjusted at a time without the substrate being damaged or corrupted, when a technique in which the liquid crystal 90 is filled between the substrates by a liquid crystal dropping method is applied. Such a characteristic allows the liquid crystal display device 100 to be manufactured at a high yield rate. Further, since the substrate gap corresponding to a plurality of single parts can be adjusted at a time, the liquid crystal display device 100 can be manufactured in a short manufacturing time.

What is claimed is:

1. A substrate gap adjusting device which adjusts a gap between first and second substrates in a composite substrate, the composite substrate including:
   the first substrate;
   the second substrate that is oppositely bonded to the first substrate through a sealant, the second substrate having a smaller area than the first substrate; and
   liquid crystal that is injected into a space surrounded by the first substrate, the second substrate, and the sealant,
   the substrate gap adjusting device comprising:
   a first base that has a mounting section;
   a ring-shaped support member that is mounted on the mounting section and that comes in contact with a second surface out of two surfaces of the first substrate so as to support the composite substrate, the second surface being opposite to a first surface on which the second substrate is bonded;
   more than two substrate pressing sections that have a movable range in a normal direction that is normal to a plane defined by the support member and that come in contact with the first substrate at a circumferential edge of the first surface; and
   external force applying sections that independently transmit force to the corresponding substrate pressing sections to displace the substrate pressing sections independently from each other within the movable range, wherein the circumferential edge of the first surface is positioned at an outer side of the support member, as seen from the normal direction.

2. The substrate gap adjusting device according to claim 1, wherein the plurality of substrate pressing sections has such a shape that the contact region with the first substrate is arc-shaped at an inner circumference, and the arc-shaped portion substantially coincides with a portion of one circle which is concentric with a circle defined by the ring-shaped support member.

3. The substrate gap adjusting device according to claim 2, wherein lengths of the respective arc-shaped portions of the contact region are substantially equal to each other.

4. The substrate gap adjusting device according to claim 1, wherein the ring-shaped support member is one of a plurality of ring-shaped support members each having different diameters.

5. The substrate gap adjusting device according to claim 1, further comprising:
   a ring-shaped second base that is detachable to the first base, wherein the substrate pressing section is attached to be relatively movable with respect to the second base so as to be capable of displacing within the movable range, and
   the external force applying sections are rotatable and include a rotation input mechanism which converts the rotation of the external force applying section into the displacement with respect to the second base of the substrate pressing section.

6. The substrate gap adjusting device according to claim 5, further comprising:
   a hand that holds the rotation input mechanism; and
   a motor that applies a rotation driving force to the hand.

7. The substrate gap adjusting device according to claim 5, further comprising:
   a first polarizing plate;
   a second polarizing plate; and
   a light source, wherein the mounting section has a translucent property, and some of light emitted from the light source passes through the first polarizing plate, the mounting section, the composite substrate, and the second polarizing plate in this order.

8. The substrate gap adjusting device according to claim 1, wherein the more than two substrate pressing sections are disposed to an outside of the second substrate so that the second substrate is exposed.

* * * * *